(12) United States Patent
Zhang

(10) Patent No.: US 12,281,814 B2
(45) Date of Patent: Apr. 22, 2025

(54) DEHUMIDIFIER

(71) Applicants: CHONGQING MIDEA AIR CONDITIONING EQUIPMENT CO., LTD., Chongqing (CN); GD MIDEA AIR-CONDITIONING EQUIPMENT CO., LTD., Foshan (CN)

(72) Inventor: Zhiming Zhang, Chongqing (CN)

(73) Assignees: CHONGQING MIDEA AIR CONDITIONING EQUIPMENT CO., LTD., Chongqing (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 75 days.

(21) Appl. No.: 18/033,031

(22) PCT Filed: Sep. 24, 2021

(86) PCT No.: PCT/CN2021/120089
§ 371 (c)(1),
(2) Date: Apr. 20, 2023

(87) PCT Pub. No.: WO2022/100292
PCT Pub. Date: May 19, 2022

(65) Prior Publication Data
US 2023/0392800 A1 Dec. 7, 2023

(30) Foreign Application Priority Data

Nov. 11, 2020 (CN) .......................... 202011265614.4
Nov. 11, 2020 (CN) .......................... 202022600843.9

(51) Int. Cl.
*F24F 3/14* (2006.01)
*F24F 13/28* (2006.01)

(52) U.S. Cl.
CPC ................ *F24F 3/14* (2013.01); *F24F 13/28* (2013.01)

(58) Field of Classification Search
CPC ........ F24F 3/14; F24F 13/28; F24F 2003/144; B01D 35/02; B01D 35/027
See application file for complete search history.

(56) References Cited

U.S. PATENT DOCUMENTS

2018/0290103 A1* 10/2018 Choi .................... B01D 53/265
2019/0316793 A1* 10/2019 Ho ........................ F24F 13/222
(Continued)

FOREIGN PATENT DOCUMENTS

CN 203518011 U 4/2014
CN 105276780 A 1/2016
(Continued)

OTHER PUBLICATIONS

The European Patent Office (EPO) Extended Search Report for EP Application No. 21890820.0 Mar. 13, 2024 9 Pages.
(Continued)

*Primary Examiner* — Patrick C Williams
(74) *Attorney, Agent, or Firm* — Anova Law Group, PLLC

(57) ABSTRACT

A dehumidifier includes a water tank, a body configured to be located over the water tank when the body is in a working state, and a drain pump provided at the body. A housing of the body is provided with a drain position. A water outlet end of the drain pump is connected to the drain position. A water inlet end of the drain pump is connected to the water tank. The water inlet end is provided with a filter.

14 Claims, 10 Drawing Sheets

(56) References Cited

U.S. PATENT DOCUMENTS

| | | | | |
|---|---|---|---|---|
| 2019/0323714 A1* | 10/2019 | Cui | .......................... | F24F 3/14 |
| 2020/0011550 A1* | 1/2020 | Williams | ................ | F24F 1/022 |
| 2020/0011556 A1* | 1/2020 | Williams | ................ | F24F 11/30 |
| 2020/0061532 A1* | 2/2020 | Yoon | .................... | F24F 13/222 |

FOREIGN PATENT DOCUMENTS

| | | |
|---|---|---|
| CN | 106440311 A | 2/2017 |
| CN | 107906635 A | 4/2018 |
| CN | 108050602 A | 5/2018 |
| CN | 208332519 U | 1/2019 |
| CN | 110145816 A | 8/2019 |
| CN | 111059649 A | 4/2020 |
| CN | 211854261 U | 11/2020 |
| CN | 112178810 A | 1/2021 |
| CN | 112283819 A | 1/2021 |
| CN | 212319938 U | 1/2021 |
| CN | 212618864 U | 2/2021 |
| CN | 213955490 U | 8/2021 |
| CN | 213955491 U | 8/2021 |
| JP | H11300142 A | 11/1999 |
| JP | 2018532094 A | 11/2018 |
| KR | 20160013477 A | 2/2016 |
| WO | 2017057928 A1 | 4/2017 |

OTHER PUBLICATIONS

The World Intellectual Property Organization (WIPO) International Search Report and Written Opinion for PCT/CN2021/120089 Dec. 6, 2021 18 pages (including English translation).

The China National Intellectual Property Administration (CNIPA) The First Office Action for Chinese Application 202011265614.4 Oct. 29, 2024 15 Pages (With Translation).

* cited by examiner

DEHUMIDIFIER

CROSS-REFERENCE TO RELATED APPLICATIONS

This application is a National Stage Entry under 35 U.S.C. § 371 of International Application No. PCT/CN2021/120089, filed on Sep. 24, 2021, which claims priority to Chinese Patent Application Nos. 202011265614.4 and 202022600843.9, filed on Nov. 11, 2020, the entire contents of all of which are incorporated herein by reference.

TECHNICAL FIELD

The present application relates to the technical field of dehumidification equipment, and in particular to a dehumidifier.

BACKGROUND

The current dehumidifier needs people to pour water. However, the water tank with water is bulky, making it more laborious and very inconvenient for the user to carry the water tank for pouring water.

Technical Problem

The main purpose of the present application is to propose a dehumidifier, aiming at reducing the need for the user to carry the water tank for pouring water.

Technical Solution

In order to achieve the above objective, the present application provides a dehumidifier, including:
 a water tank;
 a body, wherein the body is located over the water tank when in a working state, and a housing of the body is provided with a drain position; and
 a drain pump provided at the body, wherein a water outlet end of the drain pump is connected to the drain position, a water inlet end of the drain pump is connected to the water tank, and the water inlet end of the drain pump is provided with a filter.

In an embodiment, the water inlet end of the drain pump is provided with a pumping pipe, the pumping pipe is extended into the water tank, and the filter is provided at an end of the pumping pipe that is extended into the water tank.

In an embodiment, the filter includes an upper cover, a lower cover and a filter screen, the upper cover is provided with a water outlet connected to the pumping pipe, the lower cover is provided with a water inlet, the filter screen is provided between the water outlet and the water inlet, and the upper cover is detachably connected to the lower cover.

In an embodiment, the water inlet includes a bottom water inlet hole located at a bottom of the lower cover, and a side water inlet hole located at a side of the lower cover, and the filter screen is located between a water outlet hole and the side water inlet hole.

In an embodiment, a clamp protrusion is provided on an outer peripheral surface of the upper cover, the lower cover is provided with a clamp hole at least passing through its inner peripheral surface, and the clamp protrusion is clamped into the clamp hole.

In an embodiment, the outer peripheral surface of the upper cover is provided with at least two clamp protrusions, the at least two clamp protrusions are spaced along a periphery of the upper cover, and the lower cover is provided with the clamp hole corresponding to the clamp protrusion.

In an embodiment, an upper edge of the lower cover is provided with a plurality of notches, and the clamp hole is located between two adjacent notches.

In an embodiment, the water inlet end of the drain pump is further provided with a first joint, the first joint is detachably mounted at the housing, and the pumping pipe is connected to the first joint.

In an embodiment, a side of the housing is provided with a mounting position, and the first joint is detachably mounted at the mounting position.

In an embodiment, the first joint is rotatable to be clasped at the mounting position.

In an embodiment, the water inlet end of the drain pump is further provided with a second joint, and the second joint is connected to an end of the first joint away from the pumping pipe.

In an embodiment, a seal ring is provided between the first joint and the second joint.

In an embodiment, a side of the housing is provided with an avoidance recess, the avoidance recess is passed through a bottom of the housing, the mounting position is provided at a bottom of the avoidance recess, and the pumping pipe is extended into the water tank along the avoidance recess.

In an embodiment, the body is at least partially housed in the water tank when in a non-working state.

In the technical solution of the present application, the water tank is placed outside and below the body when in the working state. Compared to that the water tank is placed inside the body, the water tank of the technical solution has a larger volume, so as to accommodate more dehumidification water, and the water in the water tank can be discharged through the drain pump without carrying the water tank and removing the body, such that the user does not need to carry the water tank for pouring water, and since a filter is provided at the water inlet end of the drain pump, impurities such as dust particles in the water in the water tank can be filtered, to reduce the possibility that the impurities enter into the drain pump to cause the drain pump to be blocked.

BRIEF DESCRIPTION OF THE DRAWINGS

In order to more clearly illustrate the technical solutions in the embodiments of the present application or prior art, the following is a brief description of the drawings in the description of the embodiments or prior art, it is obvious that the drawings in the following description are only some of the embodiments of the present application, other structures can be obtained by those skilled in the art according to the structure shown in the drawings without creative work.

DESCRIPTION OF REFERENCE NUMBERS

Figure 1:
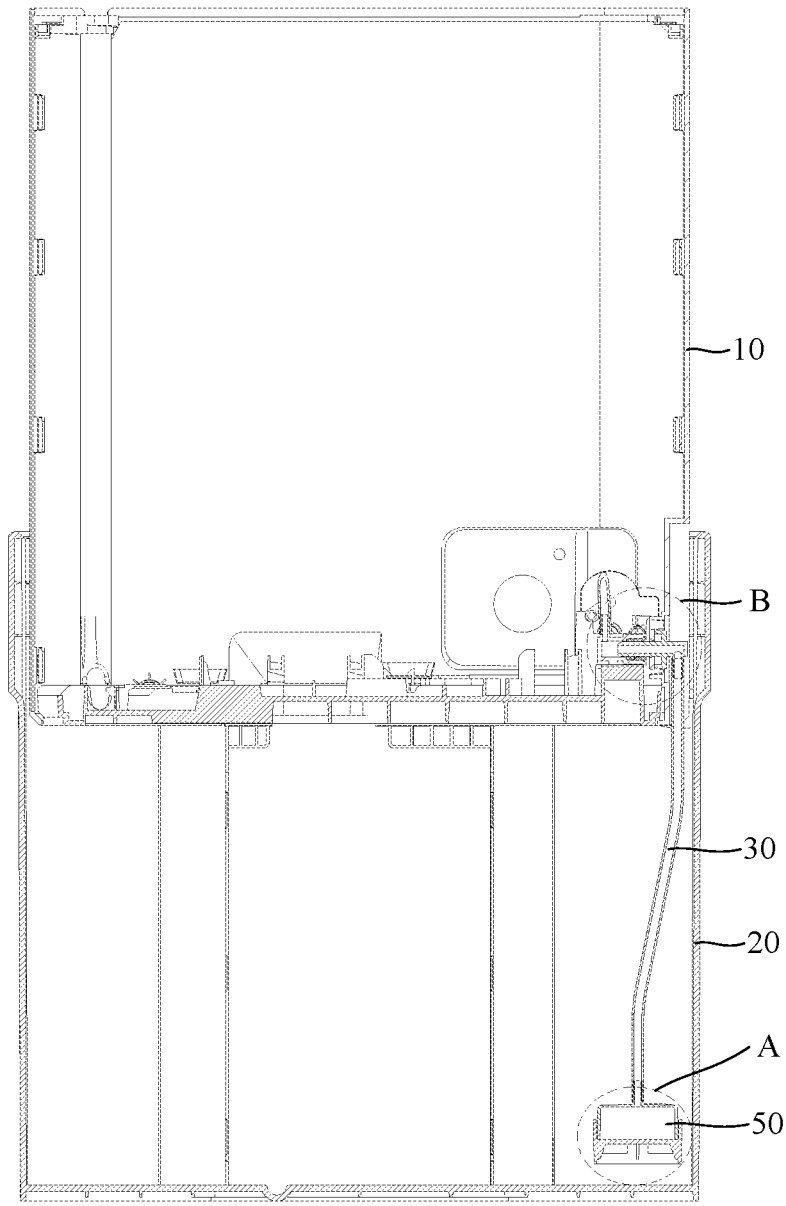
FIG. 1 is a schematic sectional view of a dehumidifier according to an embodiment of the present application, at this time the body is in a working state.

| Reference number | Name |
| --- | --- |
| 10 | body |
| 11 | housing |
| 12 | mounting position |
| 121 | mounting groove |
| 122 | annular circumferential wall |
| 123 | limit groove |
| 124 | avoidance opening |
| 125 | avoidance hole |
| 126 | second guiding slope |
| 13 | avoidance recess |
| 20 | water tank |
| 30 | pumping pipe |
| 41 | first joint |
| 411 | connection pipe |
| 412 | first pipe body |
| 413 | second pipe body |
| 414 | pipe joint |
| 415 | annular protrusion |
| 416 | limit protrusion |
| 417 | first guiding slope |
| 42 | second joint |
| 43 | seal ring |
| 44 | limit member |
| 50 | filter |
| 51 | upper cover |
| 511 | water outlet joint |
| 512 | water outlet |
| 513 | clamp protrusion |
| 514 | guiding surface |
| 52 | lower cover |
| 521 | water inlet |
| 522 | side water inlet hole |
| 523 | bottom water inlet hole |
| 524 | clamp hole |
| 525 | notch |

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that if there is a directional indication (such as up, down, left, right, front, rear . . . ) in the embodiments of the present application, the directional indication is only used to explain the relative positional relationship, movement, etc. of the components in a certain posture (as shown in the drawings). If the specific posture changes, the directional indication will change accordingly.

In addition, the terms "first" and "second," etc. in the embodiments of the present application are merely for descriptive purposes, and cannot be understood as indicating or suggesting relative importance or impliedly indicating the number of the indicated technical feature. Therefore, the feature with "first" or "second" can expressly or impliedly include at least one such feature. The meaning of "and/or" appearing herein includes three parallel scenarios. For example, "A and/or B" includes only A, or only B, or both A and B. Besides, the technical solutions of each embodiment can be combined with each other, but only on the basis that the those skilled in the art can achieve, when the combination of technical solutions appear contradictory or can not be achieved, it should be considered that such combination of technical solutions does not exist, and is not within the scope of the present application.

The present application proposes a dehumidifier.

Figure 2:
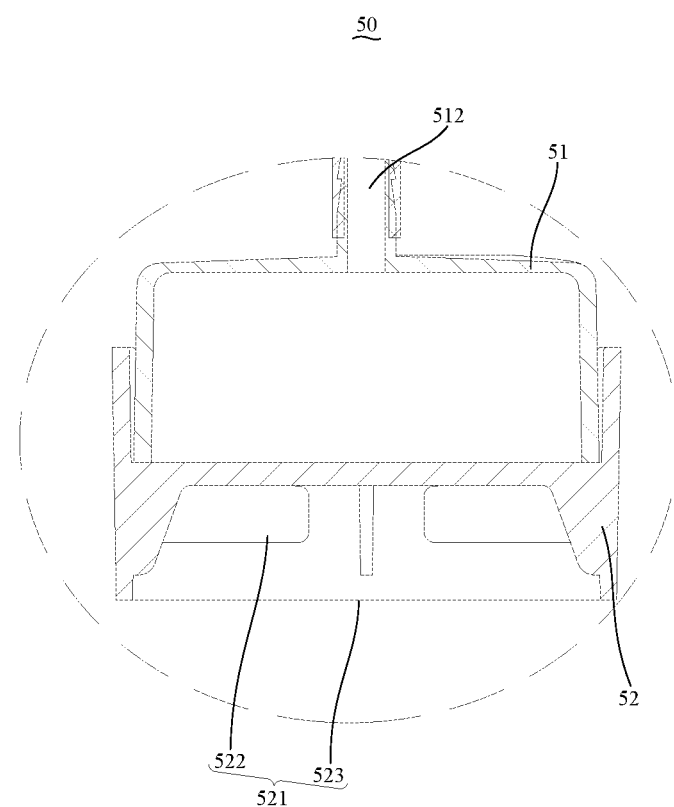
FIG. 2 is an enlarged view at position A in FIG. 1.
Figure 3:
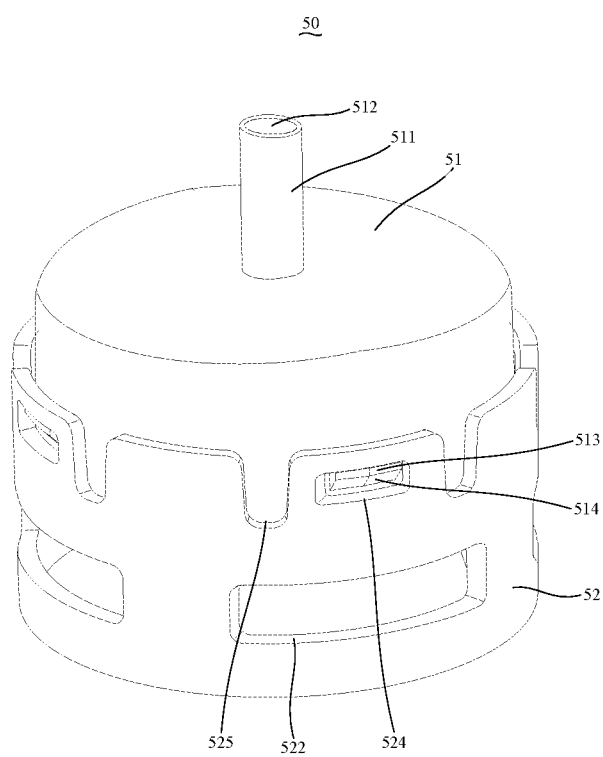
FIG. 3 is a schematic structural view of the filter in FIG. 1.

In the embodiment, referring to FIGS. 1 to 3, the dehumidifier includes a water tank 20, a body 10 and a drain pump. The body 10 is located over the water tank 20 when in a working state, and the housing 11 of the body 10 is provided with a drain position. The drain pump is provided at the body 10, and the water outlet end of the drain pump is connected to the drain position, and the water inlet end of the drain pump is connected to the water tank 20, and the water inlet end of the drain pump is provided with a filter. It should be noted that the water inlet end of the drain pump is for water entering when the drain pump is working, and the water outlet end of the drain pump is for draining water out when the drain pump is working.

In the technical solution of the present application, the water tank 20 is placed outside and below the body 10 when in the working state. Compared to that the water tank is placed inside the body 10, the water tank 20 of the technical solution has a larger volume, to accommodate more dehumidification water, and the water in the water tank 20 can be discharged through the drain pump without carrying the water tank 20 and removing the body, such that the user needn't to carry the water tank for pouring water, and since a filter 50 is provided at the water inlet end of the drain pump, impurities such as dust particles in the water in the water tank 20 can be reduced, to reduce the possibility that impurities enters into the drain pump to cause the drain pump to be blocked.

In order to facilitate the replacement of the filter, in an embodiment, compared to that the filter 50 is located inside the housing 11, the filter 50 is provided in or not in the housing 11, such that the filter 50 is more conveniently to be replaced by the user. Certainly, in other embodiment, the filter 50 can be provided in the housing 11.

In one embodiment, the water inlet end of the drain pump is provided with a pumping pipe 30, the pumping pipe 30 is extended into the water tank 20, and the filter 50 is provided at the end of the pumping pipe 30 that is extended into the water tank 20. Specifically, the drain pump is provided with a water inlet at the water inlet end, and when the water inlet end of the drain pump is provided with a pumping pipe 30, one end of the pumping pipe 30 is connected to the water inlet of the drain pump, and the other end of the pumping pipe 30 is extended into the water tank 20. When the pumping pipe 30 is set, the pumping pipe can be extended into a bottom of the water tank 20, so that the water in the water tank 20 can be pumped out as much as possible. Since the filter 50 is provided at an end of the pumping pipe 30 that is extended into the water tank 20, thus the filter 50 can be easily replaced. The pumping pipe 30 can be connected to the water inlet of the drain pump, or the pumping pipe 30 can be connected to the water inlet of the drain pump through a water inlet pipe.

To facilitate the replacement of the filter 50 or the pumping pipe 30, in one embodiment, the filter 50 is detachably connected to the pumping pipe 30. Alternatively, in other embodiments, the filter 50 can be provided between the drain pump and the pumping pipe 30. Alternatively, the filter 50 can be located at the water inlet of the drain pump.

When the filter 50 is used for a long time, many impurities are accumulated in the filter 50, the water intake of the pumping pipe 30 will be affected, so the filter 50 needs to be replaced, and in order to reduce the cost of replacing the filter 50, in an embodiment, the filter 50 includes an upper cover 51, a lower cover 52 and a filter screen, the upper cover 51 is provided with a water outlet 512 connected to the pumping pipe 30, the lower cover 52 is a water inlet 521. The filter screen is provided between the water outlet 512 and the water inlet 521, and the upper cover 51 is detachably connected to the lower cover 52, so that when many impurities are accumulated in the filter 50, the user can disassemble the upper cover 51 and the lower cover 52 to replace the filter screen, so that the upper cover 51 and the lower cover 52 can be reused, which is conducive to reducing the waste of resources, and the entire filter 50 needn't be replaced, the usage cost of the user can be reduced. The upper cover 51 and the lower cover 52 can be connected by screws, or the upper cover 51 and the lower cover 52 are connected by a threaded structure, or the upper cover 51 and the lower cover 52 are clamped, etc. The filter 50 may be substantially cylindrical, prismatic or otherwise shaped, etc.

In one embodiment, the upper cover 51 and the lower cover 52 are made of plastic to facilitate molding and reduce costs. Of course, in other embodiments, the upper cover 51 and the lower cover 52 can also be made of metal or other materials. In order to facilitate the connection between the pumping pipe 30 and the filter 50, in one embodiment, the upper cover 51 is provided with a water outlet joint 511, and the water outlet joint 511 is formed with a water outlet 512, and the pumping pipe 30 is provided in the water outlet joint 511.

When the filter 50 is provided in the lower end of the pumping pipe 30, in order to avoid contact between the filter 50 and the inner wall of the water tank 20 to lead to blockage of the water inlet 521, in an embodiment, the water inlet 521 includes a bottom water inlet hole 523 provided at a bottom of the lower cover 52, and a side water inlet hole 522 provided in a side of the lower cover 52. The filter screen is provided between a water outlet hole and the side water inlet hole 522. That is, when the drain pump pumps water out, the dehumidification water can enter the filter screen from the bottom water inlet hole 523, or from the side water inlet hole 522. Even when the bottom water inlet hole 523 is blocked due to the lower cover 52 abutting against the inner bottom wall of the water tank 20, the dehumidification water can still enter from the side water inlet hole 522. There are one or more (at least two) side water inlet holes 522, a plurality of side water inlet holes 522 are spaced along the periphery of the lower cover 52. Of course, in other embodiments, the water inlet 521 may also include only the bottom water inlet hole 523 or the side water inlet holes 522.

In one embodiment, the upper cover 51 is provided with a clamp protrusion 513 on the outer peripheral surface, and the lower cover 52 is provided with a clamp hole 524 at least passing through its inner peripheral surface, and the clamp protrusion 513 is clamped into the clamp hole 524. Specifically, the clamp hole 524 is passed through the inner and outer surfaces of the lower cover 52, the outer diameter of the upper cover 51 is smaller than the inner diameter of the lower cover 52, and the upper cover 51 can be inserted into the lower cover 52. The height of the clamp protrusion 513 compared to the outer peripheral surface of the upper cover 51 is greater than a clearance between the upper cover 51 and the lower cover 52, so that when the upper cover 51 can be inserted into the lower cover 52 and the clamp protrusion 513 is clamped into the clamp hole 524, the lower cover 52 and the upper cover 51 can be fixed. Such a simple structure facilitates the disassembly of the upper cover 51 and the lower cover 52. Of course, in other embodiments, the lower cover 52 can be provided with a clamp protrusion 513 on the outer peripheral surface of the lower cover 52, and the upper cover 51 can be provided with a clamp hole 524 at least passing through the inner peripheral surface of the upper cover 51. In addition, the clamp hole 524 does not pass through the outer peripheral surface of the lower cover 52.

To enhance the reliability of the connection between the upper cover 51 and the lower cover 52, in one embodiment, the outer peripheral surface of the upper cover 51 is provided with at least two clamp protrusions 513, the at least two clamp protrusions 513 are spaced along the periphery of the upper cover 51, and the lower cover 52 is provided with a clamp hole 524 corresponding to each of the clamp protrusions 513, that is, there are two or more clamp protrusions 513, such as three, four or more clamp protrusions 513. This increases the connection position of the upper cover 51 and the lower cover 52, and also makes the periphery of the lower cover 52 and the upper cover 51 to be subjected to force evenly, the connection reliability of the upper cover 51 and the lower cover 52 can be improved.

In one embodiment, an insertion direction is defined, the upper cover 51 is inserted into the lower cover 52 along the insertion direction, a front end of the clamp protrusion 513 is provided with a guiding surface 514 along the insertion direction, and the guiding surface 514 gradually extends inclinedly toward the outer peripheral surface of the upper cover 51 in the insertion direction. During inserting the upper cover 51 into the lower cover 52, the guiding surface 514 abuts against an opening edge of the lower cover 52 first, so that the opening edge of the lower cover 52 is gradually deformed outward along the guiding surface 514, to avoid the situation that the upper cover 51 is difficultly inserted into the lower cover 52 because the front end of the clamp protrusion 513 abuts against the opening edge of the lower cover 52.

When the upper cover 51 is inserted into the lower cover 52, the clamp protrusion 513 abuts against the lower cover 52 to be deformed, or the clamp protrusion 513 is deformed by the compression of the inner surface of the lower cover 52 until the clamp protrusion 513 is clamped into the clamp hole 524. In order to reduce the resistance subjected by the clamp protrusion 513 when being inserted into the clamp hole 524, in one embodiment, an upper edge of the lower cover 52 is provided with a plurality of notches 525. The clamp hole 524 is located between two adjacent notches 525. That is, two opposite sides of the clamp hole 524 along the periphery of the lower cover 52 are provided with the notches 525, so as to increase the elasticity of the part of the lower cover 52 provided with the clamp hole 524, so that the part of the lower cover 52 provided with the clamp hole 524 can be deformed more easily during the clamp protrusion 513 being clamped into the clamp hole 524, to reduce the resistance subjected by the clamp protrusion 513 when being clamped into the clamp hole 524, and facilitate the installation of the lower cover 52 and the upper cover 51. Of course, in other embodiments, the notch 525 may not be provided.

In one embodiment, the pumping pipe 30 is a flexible pipe. It can be understood that when the pumping pipe 30 is the flexible pipe, on the one hand, it can be easily stored by the user, on the other hand, it can avoid rigid contact between the pumping pipe 30 and the water tank 20, and the pumping pipe 30 can be set longer to be in contact with the bottom wall of the water tank 20 to fully pump out the water in the water tank 20.

In one embodiment, the water inlet end of the drain pump is also provided with a first joint 41, the first joint 41 is detachably mounted at the housing 11, and the pumping pipe 30 is connected to the first joint 41. That is, the first joint 41 is connected to the water inlet of the drain pump. It can be understood that in the embodiment, the body 10 also includes a dehumidification device provided in the housing 11, and when in the working state, the dehumidification water produced by the dehumidification device can fall into the water tank 20. In one embodiment, the dehumidification device includes a compressor, an evaporator and a condenser, first the water vapor in the air is condense as a water droplet through the evaporator, to remove the water vapor in the air, and then the condenser heats the air in which the water vapor is removed, in order to make the wind blown out back to room temperature. Of course, in other embodiments, the dehumidification device can also be used adsorption type and other dehumidification methods.

When the body 10 is in the working state, the body 10 extends out relative to the water tank 20, so that the body 10 is at least partially located over the water tank 20, and the bottom of the body 10 is spaced from the bottom of the water tank 20, so that the dehumidification water in the dehumidification device within the body 10 can be discharged into the water tank 20 (the whole body 10 can be placed above the water tank 20, but also the part of the bottom of the body 10 can be extended into the water tank 20), and the dehumidification water in the water tank 20 can be pumped out by the drain pump and drained out from the drain position. The drain pump works to drain during the work of the dehumidification device in the body 10, or the drain pump is started to drain the water out from the water tank 20 after the dehumidification device in the body 10 ends the dehumidifying work. In the working state, the drain position can be exposed outside of the water tank 20 or not. In addition, the filter 50 can also be provided between the pumping pipe 30 and the first joint 41.

In the embodiment, the body 10 is at least partially housed in the water tank 20 when in a non-working state. That is, after the water in the water tank 20 is completely drained, at least part of the body 10 can be housed in the water tank 20 to keep the body 10 in a non-working state. When in the non-working state, the body 10 is at least partially housed in the water tank 20, to reduce the center of gravity of the dehumidifier, such that the dehumidifier is placed more stably, and not easy to fall down, and the overall space occupied by the dehumidifier is reduced, it is convenient for the user to place the dehumidifier. When in the working state, the body 10 extends out relative to the water tank 20, such that the air outlet on the body 10 is located in a higher position, so that the air after dehumidification can be discharged to a higher position, which in turn makes the air after dehumidification can be more quickly spread to the entire indoor space. Of course, in other embodiments, the body 10 can be not housed in the water tank 20 when in a non-working state, for example, the body 10 can always be placed on the water tank 20, or, the body 10 can be detached from the water tank 20 when in a non-working state, the body 10 and water tank 20 are housed separately, etc.

In the technical solution of the present application, when in the working state, the water tank 20 is placed outside and below the body 10, compared to that the water tank 20 is placed inside the body 10, the water tank 20 of the present application has a larger volume, thus to receive more dehumidification water, and the first joint 41 is detachably mounted at the housing 11 of the body 10, so that when in the working state, the first joint 41 can be mounted at the mounting position 12, and connected to the water inlet of the drain pump, and the upper end of the pumping pipe 30 is connected to the first joint 41, and the lower end of the pumping pipe 30 is extended into the water tank 20, so that the water in the water tank 20 can be discharged through the drain pump and pumping pipe 30 without carrying the water tank 20, and without removing the body 10, such that the user does not need to carry the water tank 20 for pouring water. Because the first joint 41 is detachable, the first joint 41 and the pumping pipe 30 can be easily detached from the body 10, for example, when the body 10 needs to be transported or when the dehumidifier is idle and needs to be housed in the body 10, the first joint 41 and the pumping pipe 30 can be detached, to avoid interference between the first joint 41 and the pumping pipe 30 when transporting or housing the body 10, for easy handling and housing.

Figure 4:
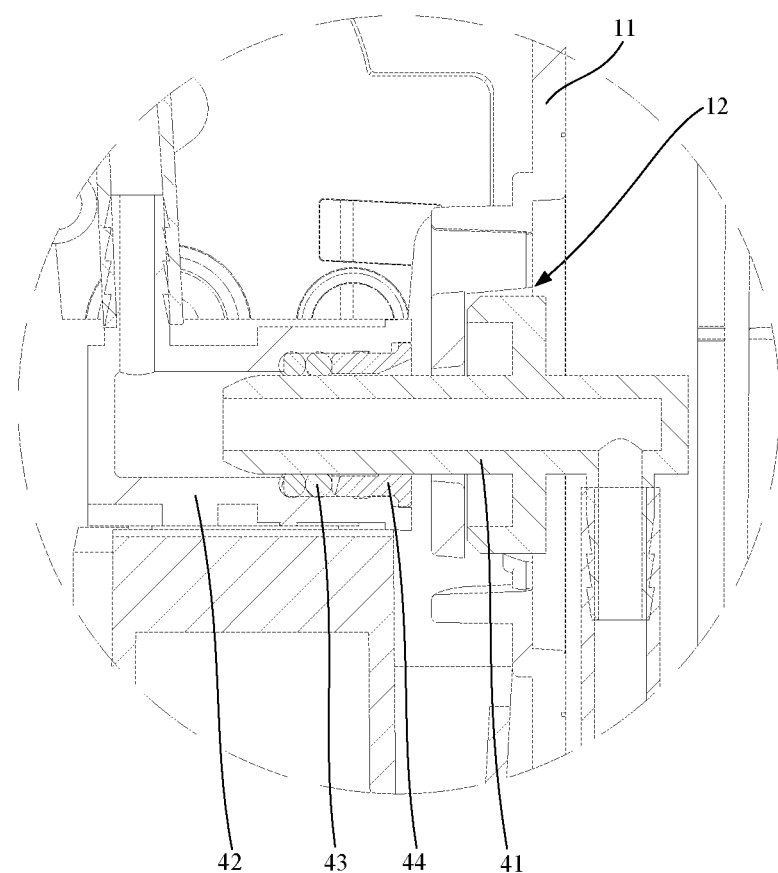
FIG. 4 is an enlarged view at position B in FIG. 1.
Figure 5:
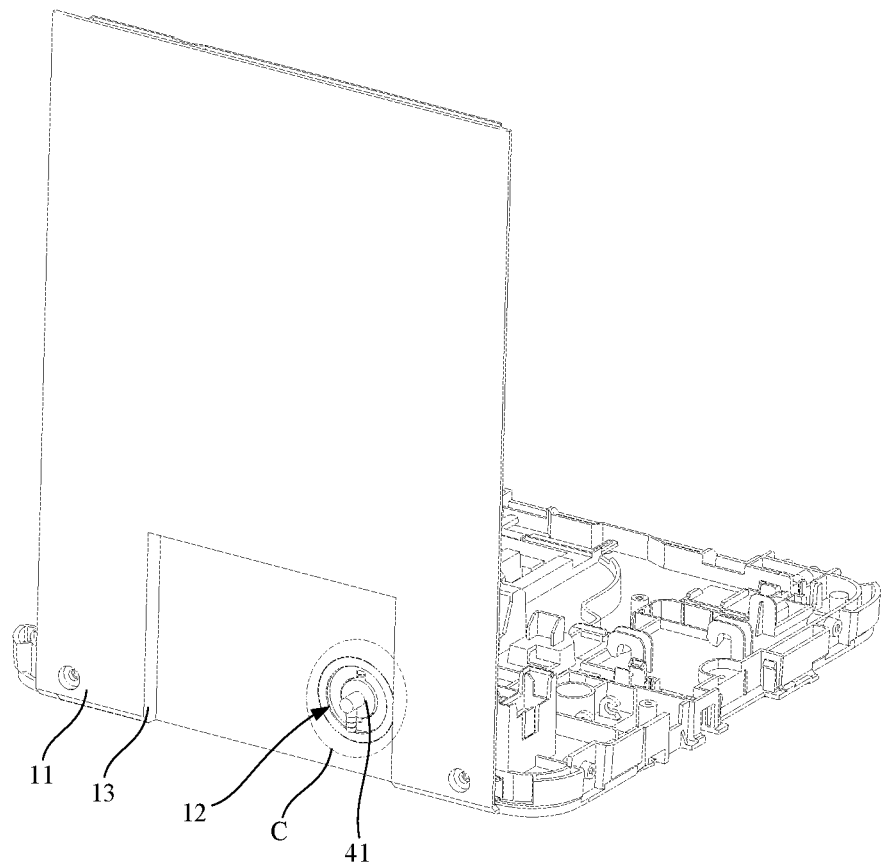
FIG. 5 is a schematic partial structural view of the housing of the body in FIG. 1.
Figure 6:
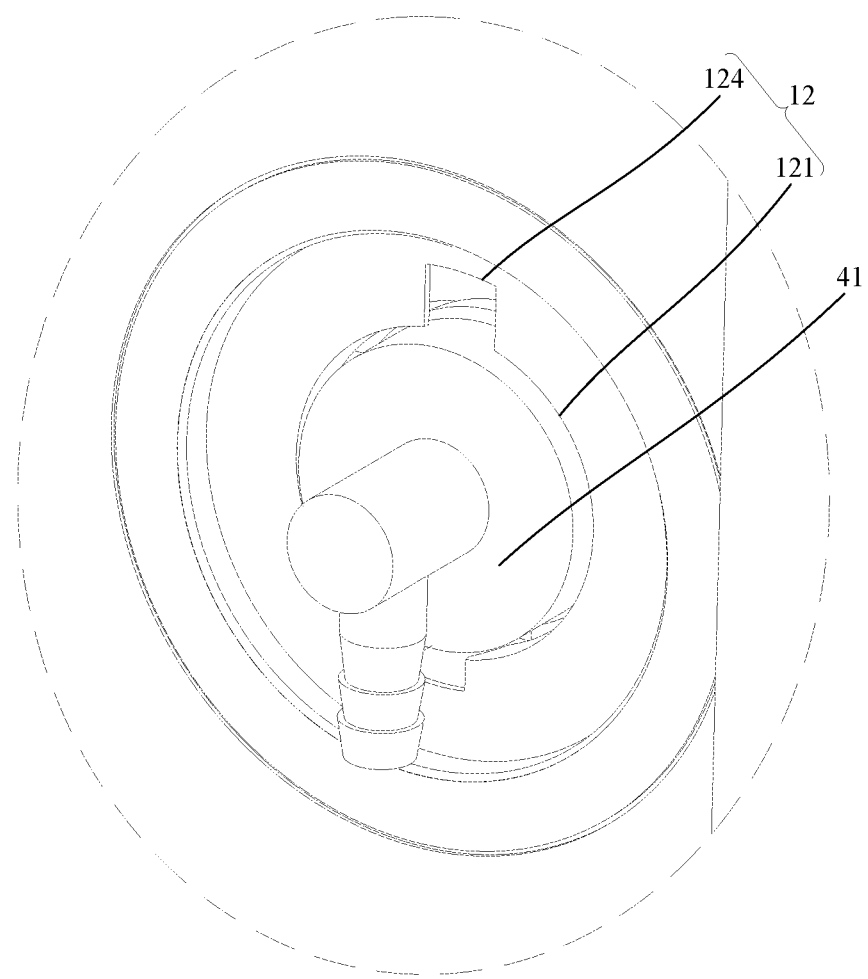
FIG. 6 is an enlarged view at position C in FIG. 5.
Figure 7:
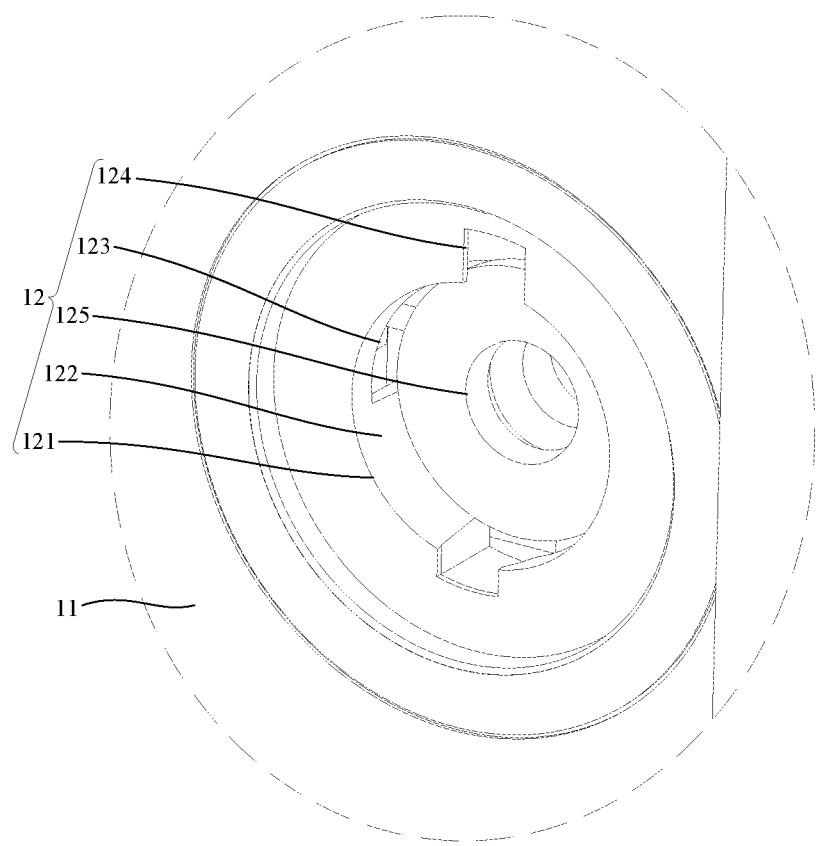
FIG. 7 is a schematic structural view after the first joint in FIG. 6 is detached.
Figure 8:
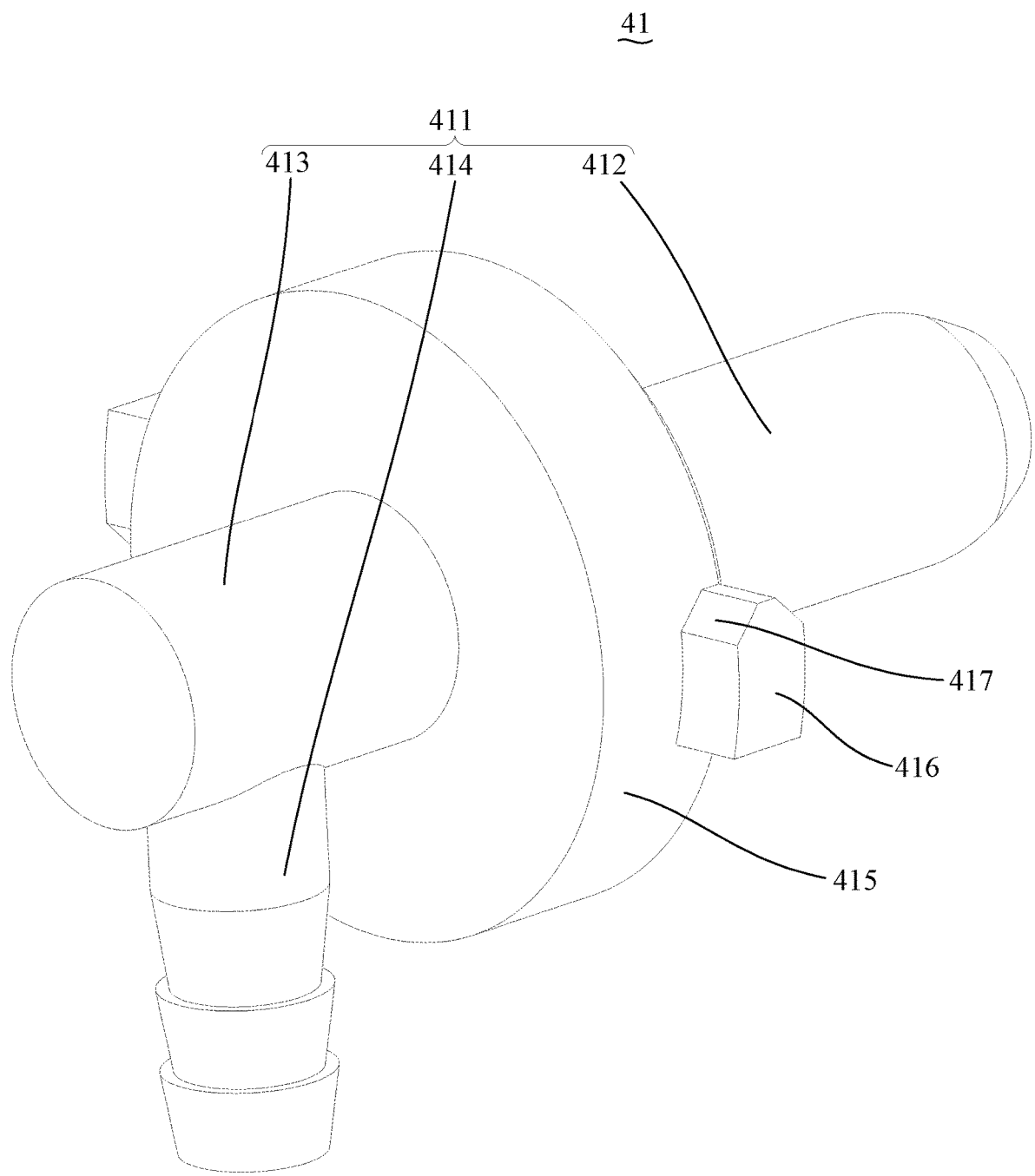
FIG. 8 is a schematic structural view of the first joint in FIG. 6.
Figure 9:
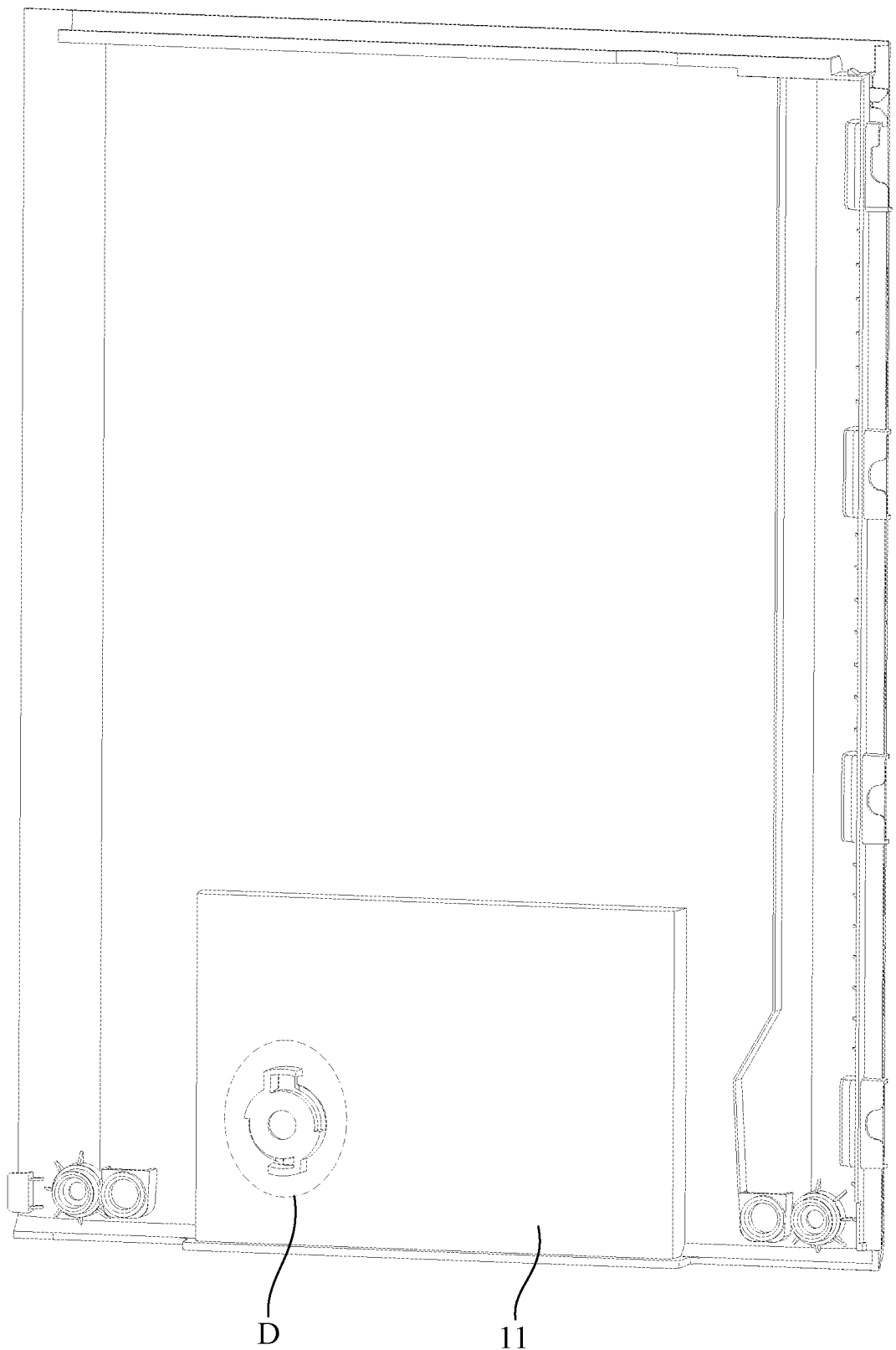
FIG. 9 is a schematic structural view of a part of the housing of the body in FIG. 1 provided with mounting positions as viewed from the inside.
Figure 10:
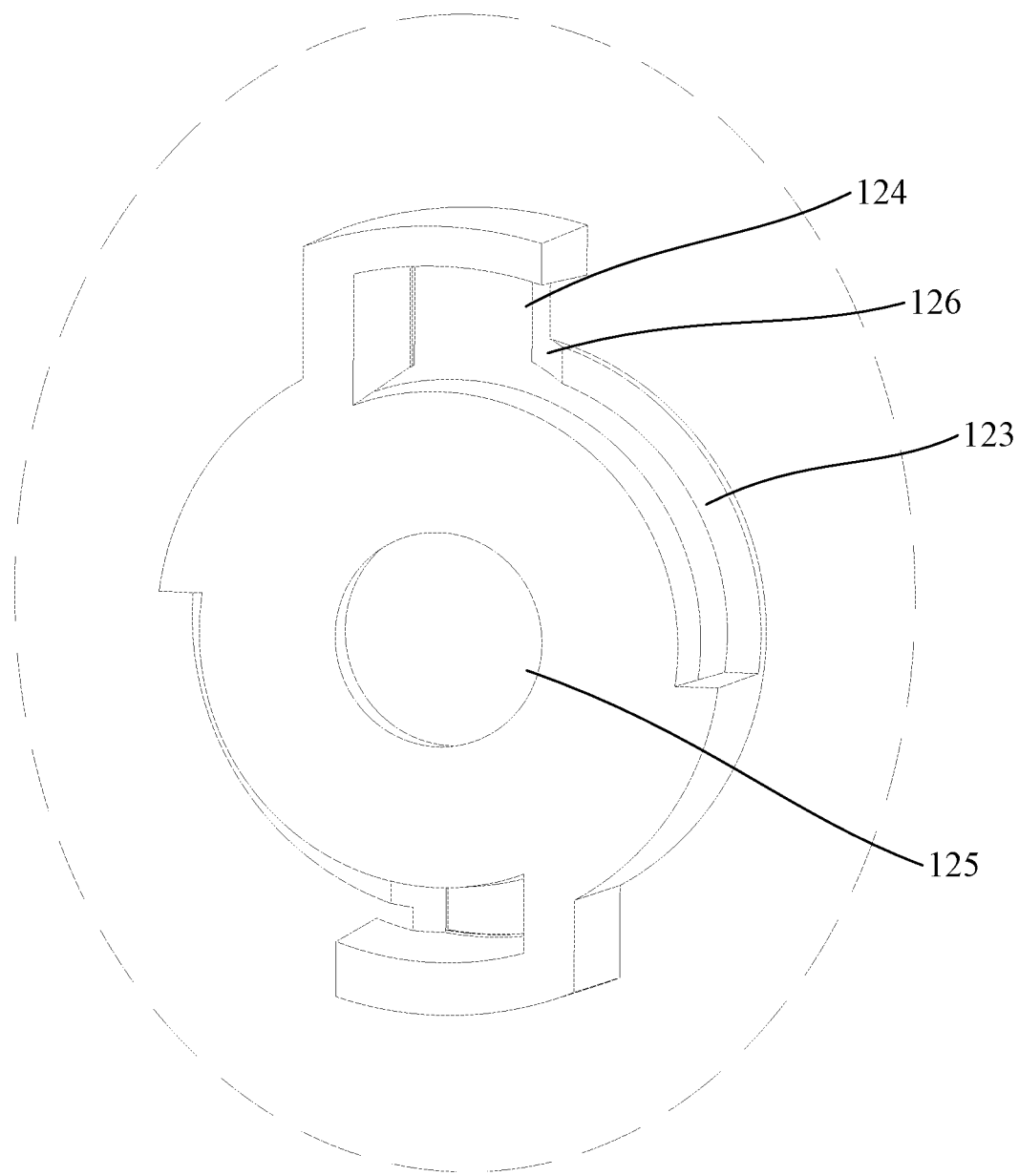
FIG. 10 is an enlarged view at position D in FIG. 9.

Referring to FIG. 4 and FIG. 5, in one embodiment, the side of the housing 11 is provided with a mounting position 12, and the first joint 41 is detachably mounted at the mounting position 12, which is equivalent to that the pumping pipe 30 is connected to the side of the housing 11, so that when the user disassembles the first joint 41, it is easy to observe the mounting position 12, and it is convenient for the user to mount the first joint 41 in the mounting position 12. It is also easy for the user to check the connection status of the first joint 41 and the mounting position 12, which can avoid that the first joint 41 is not properly connected, or falls off but the user doesn't know. Of course, in other embodiments, the mounting position 12 can also be provided in the chassis of the body 10.

In one embodiment, the water inlet end of the drain pump is also provided with a second joint 42, the second joint 42 is connected to the end of the first joint 41 away from the pumping pipe 30. Specifically, the water inlet end of the drain pump is connected to the second joint 42. The second joint 42 is also mounted at the housing 11 and is located on the inner side of the mounting position 12, and the first joint 41 is passed through the housing 11 to be inserted into the second joint 42, and the drain pump is provided in the housing 11, and the water inlet of the drain pump is connected to the second joint 42 through the water inlet pipe, which is equivalent to that the drain pump is connected to the first joint 41 through the second joint 42, such arrangement makes the position of the drain pump not to be limited, for example, the drain pump can be set at a suitable position in the body 10 and connected to the second joint 42 through the water inlet pipe, the structural rationality of the body 10 is improved to make full use of the space in the body 10. The second joint 42 is detachably connected to the housing 11, or non-detachably connected to the housing 11. In addition, the first joint 41 can be inserted into the second joint 42, or the second joint 42 can be inserted into the first joint 41. The second joint 42 can be connected to the water inlet of the drain pump, or the second joint 42 can be connected to the water inlet of the drain pump through the water inlet pipe. Of course, in other embodiments, the water inlet of the drain pump can be located on the inner side of the mounting position 12, so that the first joint 41 is inserted into the water inlet through the housing 11, or the first joint 41 is connected to the water inlet of the drain pump through the water inlet pipe, etc. In other embodiments, the drain pump can also be provided outside the housing 11, or the second joint 42 may be located outside the housing 11.

Referring to FIGS. 5 to 8, in one embodiment, the first joint 41 is rotatable for being clasped at the mounting position 12, i.e., when mounting the first joint 41, the first joint 41 is first inserted into the mounting position 12, and the first joint 41 is rotated to be clamped into the mounting position 12, so that the first joint 41 can be limited from moving straight outward from the mounting position 12. When detaching the first joint 41, the first joint 41 needs to be rotated by a certain angle before detaching the first joint 41, such that the connection of the first joint 41 is reliable and the first joint 41 is not easy to fall off. Of course, in other embodiments, the first joint 41 can also be firmly mounted at the mounting position 12.

The mounting position 12 has various structures, for example, in one embodiment, the mounting position 12 has an annular circumferential wall 122, the annular circumferential wall 122 is provided with a limit groove 123 and an avoidance opening 124, the limit groove 123 extends along the periphery of the annular circumferential wall 122 and is spaced from the outer edge of the annular circumferential wall 122, the avoidance opening 124 is passed through the side wall of the limit groove 123 and the outer edge of the annular circumferential wall 122. The outer peripheral surface of the first joint 41 is provided with a limit protrusion 416, and the limit protrusion 416 is clamped into the limit groove 123 through the avoidance opening 124.

Specifically, the annular circumferential wall 122 is substantially circular, the outer edge of the annular circumferential wall 122 is a surface where the outer side surface of the housing 11 is located around the peripheral surface of the annular circumferential wall 122, and the side wall of the limit groove 123 extends along the periphery of the annular circumferential wall 122. The portion of the first joint 41 extending into the annular circumferential wall 122 is substantially circular (the portion of the first joint 41 extending into the annular circumferential wall 122 may also be oval or polygonal, etc.). When the first joint 41 is inserted into the annular circumferential wall 122, the limit protrusion 416 is inserted into the limit groove 123 from the avoidance opening 124, and by rotating the first joint 41, the limit protrusion 416 moves in the limit groove 123 along the periphery of the annular circumferential wall 122 and moves to a position spaced from the avoidance opening 124, and the side wall of the limit groove 123 can limit the movement of the limit protrusion 416 toward the outside of the mounting position 12, to prevent the first joint 41 from out of the mounting position 12, such that it ensures the reliability of the installation of the first joint 41. Of course, in other embodiments, the annular circumferential wall 122 can be provided with a limit rib that extends along the periphery of the annular circumferential wall 122, and the limit rib is provided with a break, through which the limit protrusion 416 is clamped into the inner side of the limit rib.

In one embodiment, the mounting position 12 includes a mounting groove 121 on the side of the body 10, and an avoidance hole 125 passing through the bottom wall of the mounting groove 121, the side wall of the mounting groove 121 forms the annular circumferential wall 122. The first joint 41 includes a connection pipe 411 and an annular protrusion 415 protruding from the outer peripheral surface of the connection pipe 411. A limit protrusion 416 is provided on the outer peripheral surface of the annular protrusion 415, and the annular protrusion 415 is rotatable to be clamped into the mounting groove 121, and the connection pipe 411 is passed through the avoidance hole 125.

Specifically, the mounting groove 121 is provided on the outer side surface of the housing 11, and the avoidance hole 125 is connected to the inner cavity of the housing 11, and the diameter of the avoidance hole 125 is smaller than the diameter of the mounting groove 121. The outer edge of the annular circumferential wall 122 is a surface around a groove opening of the mounting groove 121. The annular protrusion 415 is located between two ends of the connection pipe 411, and during insertion of the first joint 41 into the mounting position 12, one end of the connection pipe 411 is extended into the inner cavity of the housing 11 from the avoidance hole 125 to connect to the water inlet of the drain pump, and the other end of the connection pipe 411 is located outside the housing 11 to connect to the pumping pipe 30. The annular protrusion 415 is inserted into the mounting groove 121 and the limit protrusion 416 corresponds to the avoidance opening 124, and the limit protrusion 416 is extended from the avoidance opening into the limit groove 123, and then by rotating the first joint 41, the limit protrusion 416 moves in the limit groove 123 along with the annular protrusion 415 along the periphery of the mounting groove 121, and moves to a position spaced from the avoidance opening 124.

Compared with that the annular protrusion is provided on the outer side surface of the housing 11 to form an annular circumferential wall 122, so that since the mounting groove 121 is provided on the outer side surface of the housing 11, it can avoid forming a protrusion structure on the outer side surface of the housing 11, to avoid the protrusion from interfering with the water tank 20. It can also reduce a protrusion height of the first joint 41 relative to the outer peripheral surface of the housing 11, to reduce the possibility of interference between the first joint 41 and the water tank 20. In some embodiments, the end of the connection pipe 411 connected to the pumping pipe 30 can be flush with the outer surface of the annular protrusion 415, and the pumping pipe 30 is inserted into the connection pipe 411. In addition, in other embodiments, the outer side surface of the housing 11 may be convexly provided with an annular protrusion, the inner side of the annular protrusion is formed to be an annular circumferential wall 122. In the embodiment, the connection pipe 411 is inserted into the second joint 42.

In one embodiment, the outer peripheral surface of the annular protrusion 415 is provided with at least two limit protrusions 416, at least two limit protrusions 416 are spaced along the periphery of the annular protrusion 415, there are at least two avoidance openings 124, one limit protrusion 416 is clamped into the limit groove 123 from one avoidance opening 124. There are one or not less than two limit groove 123. When there is one the limit groove 123, the limit groove 123 may be annular, and the plurality of avoidance openings 124 all pass through the side walls of the limit groove 123. When there are multiple limit grooves 123, for example, when there are two limit grooves 123, the two limit grooves 123 are spaced along the annular circumferential wall 122, and each limit groove 123 is provided with an avoidance opening 124, such that multiple limit protrusions 416 are provided to limit multiple positions on the periphery of the annular protrusion 415, to improve the mounting stability of the first joint 41, the first joint 41 is not easy to be loosened. There are two, three or four, etc. limit protrusions 416, so that the multiple limit protrusions 416 can be evenly spaced along the periphery of the annular protrusion 415 to ensure that everywhere on the periphery of the first joint 41 is evenly subjected to force. Of course, in other embodiments, only one limit protrusion 416 may be provided.

In one embodiment, the connection pipe 411 includes a pipe joint 414, and a first pipe body 412 and a second pipe body 413 which are located on two opposite sides in a shaft of the annular protrusion 415. The first pipe body 412 is passed through the avoidance hole 125 and inserted into the second joint 42, and the pipe joint 414 is provided on the outer peripheral surface of the second pipe body 413, and the pipe joint 414 is connected to the upper end of the pumping pipe 30. That is, the pipe joint 414 is extended toward a side of the first pipe body 412, for example, when the first joint 41 is mounted in place, so that the pipe joint 414 faces downward, so that the second pipe body 413 and the pipe joint 414 are set in a roughly shape like "L" letter, such arrangement can reduce the convex height of the second pipe body 413 and the pipe joint 414 relative to the outer side surface of the housing 11, thus to reduce the convex height of the pumping pipe 30 relative to the outer side surface of the housing 11, which can further reduce the possibility of crushing damage to the pumping pipe 30. Of course, in other embodiments, it is possible to connect the pumping pipe 30 to the second pipe body 413 without setting the pipe joint 414.

In one embodiment, the limit protrusion 416 is provided with a first guiding slope 417, which is used to cooperate with the side wall of the limit groove 123. Specifically, the first guiding slope 417 is located at a front end of the limit protrusion 416 that rotatably enters from the avoidance opening 124 into the limit groove 123, and is located on the surface of the limit protrusion 416 away from the interior of the housing 11, i.e., the first guiding slope 417 faces the side wall of the limit groove 123 when the limit protrusion 416 is clamped into the limit groove 123. Since the first guiding slope 417 is provided, it is possible to make the front end of the limit protrusion 416 to be spaced at least partially from the side wall of the limit groove 123 after the limit protrusion 416 is inserted through the avoidance opening 124, to avoid the front end of the limit protrusion 416 from interfering with an intersection of the avoidance opening 124 and the side wall of the limit groove 123, and to ensure that the limit protrusion 416 enters the limit groove 123 smoothly.

Referring to FIGS. 7 to 10, in one embodiment, the side wall of the limit groove 123 is provided with a second guiding slope 126, which gradually extends in a direction close to the avoidance opening 124 toward the outer edge of the annular circumferential wall 122, and the second guiding slope 126 is used to cooperate with the limit protrusion 416. Since the second guiding slope 126 is provided, the intersection of the side wall of the limit groove 123 and the avoidance opening 124 is set as a flare, to avoid the situation that the front end of the limit protrusion 416 interferes with the intersection of the side wall of the avoidance opening 124 and the limit groove 123 after the limit protrusion 416 is inserted through the avoidance opening 124, and to ensure that the limit protrusion 416 enters the limit groove 123 smoothly.

Referring to FIGS. 1 and 4, in order to reduce the possibility of water leakage between the first joint 41 and the second joint 42, in one embodiment, a seal ring 43 is provided between the first joint 41 and the second joint 42. Specifically, the seal ring 43 is provided inside the second joint 42, and the first joint 41 is inserted inside the seal ring 43, and the outer periphery of the seal ring 43 abuts against the inner wall of the second joint 42. Since the seal ring 43 is provided between the first joint 41 and the second joint 42, it can prevent water leakage on the one hand, and on the other hand, it can reduce the cooperation precision between the first joint 41 and the second joint 42, even if the gap between the first joint 41 and the second joint 42 is large, it can be sealed by the seal ring 43. There is one or not less than two seal rings 43. Of course, in other embodiments, it is also possible to insert the first joint 41 in the second joint 42 with interference.

In one embodiment, the inner wall of the second joint 42 is provided with an annular accommodation groove, the annular accommodation groove is located at the end of the second joint 42 for insertion of the first joint 41, an inner diameter of the seal ring 43 in the annular accommodation groove is less than or equal to an outer diameter of the seal ring 43, and the inner diameter of the second joint 42 is greater than the inner diameter of the seal ring 43, so that when the seal ring 43 is provided in the annular accommodation groove, the inner side of the seal ring 43 protrudes from the inner wall surface of the second joint 42. The headwear device also includes a limit member 44, which is mounted to the second joint 42 to limit the seal ring 43 within the annular accommodation groove and prevent the seal ring 43 from being dislodged from the second joint 42. The limit member 44 is provided with an avoidance hole, and the avoidance hole is connected to the second joint 42, and the first joint 41 is inserted into the second joint 42 from the avoidance hole.

Referring to FIG. 1 and FIG. 5, in order to reduce the interference between the pumping pipe 30 and the inner wall of the water tank 20, in an embodiment, the side of the housing 11 is provided with an avoidance groove 13, the avoidance groove 13 is passed through the bottom of the housing 11, the mounting position 12 is provided at the bottom of the groove 13, the pumping pipe 30 enters into the water tank 20 along the avoidance groove 13. That is, the outer side surface of the housing 11 is provided with the avoidance groove 13, the pumping pipe 30 enters through the avoidance groove 13 downward into the water tank 20. Since the avoidance groove 13 is provided, the protrusion height of the pumping pipe 30 relative to the outer side surface of the housing 11 can be reduced, so that when the body 10 is in working state, the extrusion of the inner wall of the water tank 20 on the pumping pipe 30 can be reduced, to ensure the pumping effect of the pumping pipe 30, and it can also further reduce the difficulty of the body 10 being placed into the water tank 20 due to the interference between the pumping pipe 30 and the inner wall of the water tank 20, to reduce the possibility of crushing damage to the pumping pipe 30. In addition, after the avoidance groove 13 is set, the gap between the outer side surface of the housing 11 and the inner wall of the water tank 20 is reduced, which is conducive to reducing the volume of the water tank 20, to make the overall structure of the dehumidifier more compact. Of course, in other embodiments, the avoidance groove 13 is not provided.

The above is only the embodiment of the present application, not to limit the scope of the present application. Any equivalent structural transformation made under the inventive concept of the present application, using the specification and the attached drawings, or direct/indirect application in other related technical fields are included in the scope of the present application.

What is claimed is:
1. A dehumidifier comprising:
    a water tank;
    a body configured to be located over the water tank when the body is in a working state, a housing of the body being provided with a drain position; and
    a drain pump provided at the body, a water outlet end of the drain pump being connected to the drain position, a water inlet end of the drain pump being connected to the water tank, and the water inlet end being provided with a filter;

wherein:
the water inlet end of the drain pump is provided with a pumping pipe extending into the water tank;
the filter is provided at an end of the pumping pipe that extends into the water tank; and
the filter includes:
an upper cover provided with a water outlet connected to the pumping pipe;
a lower cover detachably connected to the upper cover and provided with a water inlet; and
a filter screen provided between the water outlet and the water inlet.

2. The dehumidifier according to claim 1, wherein:
the water inlet includes:
a bottom water inlet hole located at a bottom of the lower cover; and
a side water inlet hole located at a side of the lower cover; and
the filter screen is located between the water outlet and the side water inlet hole.

3. The dehumidifier according to claim 1, wherein a clamp protrusion is provided on an outer peripheral surface of the upper cover, the lower cover is provided with a clamp hole at least passing through an inner peripheral surface of the lower cover, and the clamp protrusion is clamped in the clamp hole.

4. The dehumidifier according to claim 3, wherein:
the clamp protrusion is one of at least two clamp protrusions provided on the outer peripheral surface of the upper cover, and the at least two clamp protrusions are spaced along a periphery of the upper cover; and
the clamp hole is one of at least two clamp holes provided at the lower cover, and each of the at least two clamp holes corresponds to one of the at least two clamp protrusions.

5. The dehumidifier according to claim 3, wherein an upper edge of the lower cover is provided with a plurality of notches, and the clamp hole is located between two adjacent ones of the plurality of notches.

6. The dehumidifier according to claim 1, wherein the water inlet end of the drain pump is further provided with a joint detachably mounted at the housing, and the pumping pipe is connected to the joint.

7. The dehumidifier according to claim 6, wherein a side of the housing is provided with a mounting position, and the joint is detachably mounted at the mounting position.

8. The dehumidifier according to claim 7, wherein the joint is rotatable to be clasped at the mounting position.

9. The dehumidifier according to claim 8, wherein:
the joint is a first joint; and
the water inlet end of the drain pump is further provided with a second joint connected to an end of the first joint away from the pumping pipe.

10. The dehumidifier according to claim 9, wherein a seal ring is provided between the first joint and the second joint.

11. The dehumidifier according to claim 7, wherein a side of the housing is provided with an avoidance recess passing through a bottom of the housing, the mounting position is provided at a bottom of the avoidance recess, and the pumping pipe extends into the water tank along the avoidance recess.

12. The dehumidifier according to claim 1, wherein the body is at least partially housed in the water tank when the housing is in a non-working state.

13. A dehumidifier comprising:
a water tank;
a body configured to be located over the water tank when the body is in a working state, a housing of the body being provided with a drain position; and
a drain pump provided at the body, a water outlet end of the drain pump being connected to the drain position, a water inlet end of the drain pump being connected to the water tank, and the water inlet end being provided with a filter;

wherein:
the water inlet end of the drain pump is provided with a pumping pipe extending into the water tank;
the filter is provided at an end of the pumping pipe that extends into the water tank;
the water inlet end of the drain pump is further provided with a joint detachably mounted at the housing, and the pumping pipe is connected to the joint;
a side of the housing is provided with a mounting position, and the joint is detachably mounted at the mounting position; and
the joint is rotatable to be clasped at the mounting position.

14. A dehumidifier comprising:
a water tank;
a body configured to be located over the water tank when the body is in a working state, a housing of the body being provided with a drain position; and
a drain pump provided at the body, a water outlet end of the drain pump being connected to the drain position, a water inlet end of the drain pump being connected to the water tank, and the water inlet end being provided with a filter;

wherein:
the water inlet end of the drain pump is provided with a pumping pipe extending into the water tank;
the filter is provided at an end of the pumping pipe that extends into the water tank;
the water inlet end of the drain pump is further provided with a joint detachably mounted at the housing, and the pumping pipe is connected to the joint;
a side of the housing is provided with a mounting position, and the joint is detachably mounted at the mounting position; and
a side of the housing is provided with an avoidance recess passing through a bottom of the housing, the mounting position is provided at a bottom of the avoidance recess, and the pumping pipe extends into the water tank along the avoidance recess.

\* \* \* \* \*